(12) United States Patent
Kubo et al.

(10) Patent No.: US 12,392,946 B2
(45) Date of Patent: Aug. 19, 2025

(54) OPTICAL FILTER AND LIGHT-ABSORBING COMPOSITION

(71) Applicant: Nippon Sheet Glass Company, Limited, Tokyo (JP)

(72) Inventors: Yuichiro Kubo, Tokyo (JP); Hisao Imai, Kanagawa (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 806 days.

(21) Appl. No.: 17/282,240

(22) PCT Filed: Oct. 2, 2019

(86) PCT No.: PCT/JP2019/039022
§ 371 (c)(1),
(2) Date: Apr. 1, 2021

(87) PCT Pub. No.: WO2020/071461
PCT Pub. Date: Apr. 9, 2020

(65) Prior Publication Data
US 2021/0356638 A1  Nov. 18, 2021

(30) Foreign Application Priority Data
Oct. 5, 2018  (JP) .................................. 2018-189851

(51) Int. Cl.
*G02B 5/20* (2006.01)
(52) U.S. Cl.
CPC .................................... *G02B 5/208* (2013.01)
(58) Field of Classification Search
CPC .......... G02B 5/208; G02B 5/223; G02B 5/22; G02B 1/00; C03C 17/009; C03C 17/32;
(Continued)

(56) References Cited

U.S. PATENT DOCUMENTS

| 2018/0003872 A1 | 1/2018 | Kubo et al. |
| 2018/0017720 A1 | 1/2018 | Arimura et al. |

(Continued)

FOREIGN PATENT DOCUMENTS

| JP | 2007056105 | 3/2007 |
| JP | 2011029419 A | 2/2011 |

(Continued)

OTHER PUBLICATIONS

International Search Report and Written Opinion issued for International Patent Application No. PCT/JP2019/039022, Date of mailing: Dec. 10, 2019, 10 pages including English translation of Search Report.

*Primary Examiner* — Marin Pichler
(74) *Attorney, Agent, or Firm* — HSML P.C.

(57) ABSTRACT

An optical filter (1a) has a thickness of 120 µm or less and satisfies the following requirements (i), (ii), (iii), and (iv): (i) an average transmittance in a wavelength range of 450 nm to 600 nm is 74% or more; (ii) a maximum transmittance in a wavelength range of 750 nm to 1080 nm is 1% or less; (iii) an infrared cut-off wavelength being a wavelength which lies in a wavelength range of 550 nm to 700 nm and at which a spectral transmittance is 50% is in a range of 600 nm to 680 nm; and (iv) an ultraviolet cut-off wavelength being a wavelength which lies in a wavelength range of 350 nm to 500 nm and at which a spectral transmittance is 50% is in a range of 350 nm to 420 nm.

9 Claims, 9 Drawing Sheets

(58) Field of Classification Search
CPC ........ C08J 7/04; C08K 5/0041; C08K 5/5317; C09D 1/00; C09D 5/00
See application file for complete search history.

(56) References Cited

U.S. PATENT DOCUMENTS

| | | | |
|---|---|---|---|
| 2019/0219749 A1* | 7/2019 | Shimmo | G02B 5/28 |
| 2019/0346601 A1 | 11/2019 | Kubo et al. | |
| 2020/0040161 A1 | 2/2020 | Kubo et al. | |
| 2020/0158930 A1 | 5/2020 | Kubo | |
| 2020/0233130 A1 | 7/2020 | Kubo | |

FOREIGN PATENT DOCUMENTS

| | | | |
|---|---|---|---|
| JP | 2011118255 | 6/2011 | |
| JP | 2011227528 | 11/2011 | |
| JP | 5738014 | 6/2015 | |
| JP | 5738031 | 6/2015 | |
| JP | 2016124903 | 7/2016 | |
| JP | 2016188316 A | 11/2016 | |
| JP | 6232161 | 11/2017 | |
| JP | 6267823 | 1/2018 | |
| JP | 6281023 | 2/2018 | |
| WO | 2009123016 | 10/2009 | |
| WO | 2015/107939 | 7/2015 | |
| WO | 2016158818 A1 | 10/2016 | |
| WO | 2017006571 | 1/2017 | |
| WO | 2017126528 | 7/2017 | |
| WO | WO-2018003756 A1 * | 1/2018 | ............... B32B 7/02 |
| WO | 2018088561 A1 | 5/2018 | |
| WO | 2018123705 | 7/2018 | |
| WO | 2018173386 | 9/2018 | |

* cited by examiner

OPTICAL FILTER AND LIGHT-ABSORBING COMPOSITION

TECHNICAL FIELD

The present invention relates to an optical filter and a light-absorbing composition.

BACKGROUND ART

In imaging apparatuses employing a solid-state imaging sensor such as a charge coupled device (CCD) or a complementary metal oxide semiconductor (CMOS), any of various optical filters is disposed ahead of the solid-state imaging sensor in order to obtain an image with good color reproduction. Solid-state imaging sensors generally have spectral sensitivity over a wide wavelength range from the ultraviolet to infrared regions. On the other hand, the visual sensitivity of humans lies solely in the visible region. Thus, a technique is known in which an optical filter shielding against infrared light or ultraviolet light is disposed ahead of a solid-state imaging sensor in an imaging apparatus in order to allow the spectral sensitivity of the solid-state imaging sensor to approximate to the visual sensitivity of humans.

It has been common for such an optical filter to shield against infrared or ultraviolet light by means of light reflection by a dielectric multilayer film. In recent years, optical filters including a light-absorbing layer including a light absorber have been attracting attention. The transmittance properties of optical filters including a light-absorbing layer are unlikely to be dependent on the incident angle, and that makes it possible to obtain favorable images with less color change even when light is obliquely incident on the optical filters in imaging apparatuses. Moreover, optical filters including a film including a light absorber are advantageous also in terms of reducing the size and thickness of imaging apparatuses.

For example, Patent Literature 1 describes an optical filter including a UV-IR-absorbing layer capable of absorbing infrared and ultraviolet light, the optical filter having given transmittance properties. The UV-IR-absorbing layer includes, for example, a UV-IR absorber formed of a phosphonic acid and copper ion.

Patent Literature 2 describes an infrared cut filter including an organic dye-containing layer including a given organic dye and a copper phosphonate-containing layer including fine particles of copper phosphonate.

Patent Literature 3 describes a method for producing a fine copper salt particle-dispersed resin. This production method includes a step A, a step B, and a step C. The step A is a step of washing a mixture of near-infrared-absorbing fine copper salt particles and a dispersant with a solvent, allowing precipitation of the fine copper salt particles, and removing the supernatant liquid to obtain the fine copper salt particles. The step B is a step of dispersing the fine copper salt particles obtained in the step A in a dispersion medium to obtain a dispersion liquid. The step C is a step of mixing the dispersion liquid and a resin to obtain a fine copper salt particle-dispersed resin. At least a portion of the near-infrared-absorbing fine copper salt particles is a given alkylphosphonic acid copper salt.

Patent Literature 4 describes a method for producing a dispersion liquid containing a near-infrared absorber. In this production method, a reaction mixture including a near-infrared absorber is obtained by mixing a phosphonic acid compound, a given phosphoric acid ester compound, and a copper salt in a solvent. Solids in the reaction mixture are allowed to precipitate and the supernatant is removed. A purified near-infrared absorber can be obtained by drying the solids. The purified near-infrared absorber is dispersed in a dispersion medium.

Patent Literature 5 describes a phthalocyanine compound having a high visible transmittance and high near-infrared cutting efficiency in the wavelength range of 850 to 950 nm.

Patent Literature 6 describes an infrared-absorbing material including a given copper phosphonate compound and a resin.

CITATION LIST

Patent Literature

Patent Literature 1: JP 6232161 B1
Patent Literature 2: JP 6281023 B2
Patent Literature 3: JP 5738031 B2
Patent Literature 4: JP 5738014 B2
Patent Literature 5: JP 2007-056105 A
Patent Literature 6: WO 2009/123016 A1

SUMMARY OF INVENTION

Technical Problem

Most of the UV-IR-absorbing layers according to examples in Patent Literature 1 have a thickness in the range of 130 to 220 μm. Patent Literature 1 also describes an optical filter including a 76-μm-thick UV-IR-absorbing layer. This optical filter includes an infrared-absorbing glass substrate and achieves the given transmittance properties by the combination of the UV-IR-absorbing layer and the infrared-absorbing glass substrate.

According to the technique described in Patent Literature 2, the organic dye-containing layer and the copper phosphonate-containing layer need to be formed separately, which tends to complicate the production process of the infrared cut filter.

It is unknown what transmittance properties a near-infrared-absorbing layer formed using the fine copper salt particle-dispersed resin described in Patent Literature 3 will have. In addition, it is unknown what transmittance properties a near-infrared-absorbing layer formed using the dispersion liquid containing the near-infrared absorber and described in Patent Literature 4 will have.

The phthalocyanine compound described in Patent Literature 5 has a high visible transmittance and high near-infrared cutting efficiency in the wavelength range of 850 to 950 nm. However, it is unknown what transmittance properties a near-infrared-absorbing layer formed using this phthalocyanine compound will have.

In Patent Literature 6, the spectral transmittance is measured for a laminated glass obtained by sandwiching a 0.76-mm-thick sheet formed of the infrared-absorbing material including the given copper phosphonate compound and the resin between two glass slides. This laminated glass has a relatively high maximum transmittance in the wavelength range of 750 nm to 1080 nm.

Therefore, the present invention provides an optical filter including a light-absorbing layer having a thickness smaller than a given thickness (for example, 120 μm or less or 80 μm or less) but having desired transmittance properties and being advantageous in simplifying the production process of optical filters. The present invention also provides a light-absorbing composition suitable for forming the light-absorbing layer of the optical filter.

Solution to Problem

The present invention provides an optical filter including a light-absorbing layer having a thickness of 120 µm or less, the light-absorbing layer satisfying the following requirements (i), (ii), (iii), and (iv):
 (i) an average transmittance in a wavelength range of 450 nm to 600 nm is 74% or more;
 (ii) a maximum transmittance in a wavelength range of 750 nm to 1080 nm is 1% or less;
 (iii) an infrared cut-off wavelength being a wavelength which lies in a wavelength range of 550 nm to 700 nm and at which a spectral transmittance is 50% is in a range of 600 nm to 680 nm; and
 (iv) an ultraviolet cut-off wavelength being a wavelength which lies in a wavelength range of 350 nm to 500 nm and at which a spectral transmittance is 50% is in a range of 350 nm to 420 nm.

The present invention also provides an optical filter including a light-absorbing layer having a thickness of 80 µm or less, the light-absorbing layer satisfying the following requirements (I), (II), (III), and (IV):
 (I) an average transmittance in a wavelength range of 450 nm to 600 nm is 74% or more;
 (II) a maximum transmittance in a wavelength range of 750 nm to 1080 nm is 5% or less;
 (III) an infrared cut-off wavelength being a wavelength which lies in a wavelength range of 550 nm to 700 nm and at which a spectral transmittance is 50% is in a range of 600 nm to 680 nm; and
 (IV) an ultraviolet cut-off wavelength being a wavelength which lies in a wavelength range of 350 nm to 500 nm and at which a spectral transmittance is 50% is in a range of 350 nm to 420 nm.

The present invention further provides a light-absorbing composition including:
 a copper phosphonate; and
 an organic solvent, wherein
 a concentration of an acid being a by-product of generation of the copper phosphonate is 1.0 mass % or less.

Advantageous Effects of Invention

The light-absorbing layers of the above optical filters each have a thickness smaller than the given thickness but have the desired spectral transmittance and are advantageous in simplifying the production process of optical filters. Additionally, the above light-absorbing composition is suitable for forming the light-absorbing layers of the above optical filters.

DESCRIPTION OF EMBODIMENTS

Hereinafter, embodiments of the present invention will be described. The following description is directed to some examples of the present invention, and the present invention is not limited by these examples.

Figure 1A:
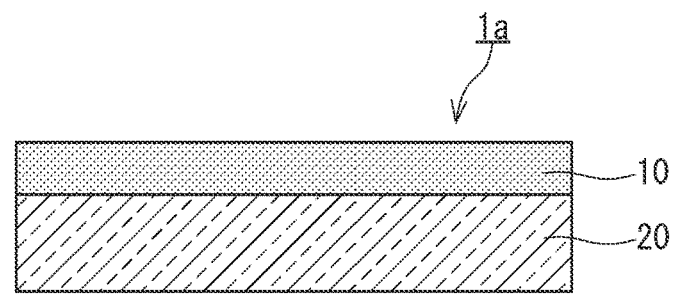
FIG. 1A is a cross-sectional view showing an optical filter according to an example of an embodiment of the present invention.

As shown in FIG. 1A, an optical filter 1a includes a light-absorbing layer 10. The light-absorbing layer 10 has a thickness of, for example, 120 µm or less. Additionally, the light-absorbing layer 10 satisfies, for example, the following requirements (i), (ii), (iii), and (iv):
 (i) an average transmittance in a wavelength range of 450 nm to 600 nm is 74% or more;
 (ii) a maximum transmittance in a wavelength range of 750 nm to 1080 nm is 1% or less;
 (iii) an infrared cut-off wavelength being a wavelength which lies in a wavelength range of 550 nm to 700 nm and at which a spectral transmittance is 50% is in a range of 600 nm to 680 nm; and
 (iv) an ultraviolet cut-off wavelength being a wavelength which lies in a wavelength range of 350 nm to 500 nm and at which a spectral transmittance is 50% is in a range of 350 nm to 420 nm.

By virtue of the fact that the light-absorbing layer 10 satisfies the requirement (i), the optical filter 1a is likely to have a sufficiently high transmittance in the visible range. Therefore, when the optical filter 1a is used together with a solid-state imaging device, visible light of sufficient brightness is likely to be incident on the solid-state imaging device.

By virtue of the fact that the light-absorbing layer 10 satisfies the requirement (ii), the optical filter 1a is likely to have a sufficiently low transmittance in the wavelength range of 750 nm to 1080 nm even when the optical filter 1a includes neither a light-absorbing layer other than the light-absorbing layer 10 nor a near-infrared-reflecting layer. The optical filter 1a is therefore likely to have good light-shielding performance in the near-infrared region. When used together with a solid-state imaging device, the optical filter 1a can cut off light in the near-infrared region which cannot be sensed by human vision. As a result, the properties of the optical filter 1a are likely to conform to the visual sensitivity of humans.

By virtue of the fact that the light-absorbing layer 10 satisfies the requirements (iii) and (iv), the properties of the optical filter 1a are likely to conform to the visual sensitivity of humans.

When the light-absorbing layer 10 satisfies the requirements (i) to (iv), the lower limit of the thickness of the light-absorbing layer 10 is, for example, but not particularly limited to, 70 μm or more.

The light-absorbing layer 10 may have a thickness of 80 μm or less. In this case, the light-absorbing layer 10 satisfies, for example, the following requirements (I), (II), (III), and (IV):

(I) an average transmittance in a wavelength range of 450 nm to 600 nm is 74% or more;
(II) a maximum transmittance in a wavelength range of 750 nm to 1080 nm is 5% or less;
(III) an infrared cut-off wavelength being a wavelength which lies in a wavelength range of 550 nm to 700 nm and at which a spectral transmittance is 50% is in a range of 600 nm to 680 nm; and
(IV) an ultraviolet cut-off wavelength being a wavelength which lies in a wavelength range of 350 nm to 500 nm and at which a spectral transmittance is 50% is in a range of 350 nm to 420 nm.

By virtue of the fact that the light-absorbing layer 10 satisfies (II), the optical filter 1a is likely to have sufficient light-shielding performance in the near-infrared region.

When the light-absorbing layer 10 satisfies the requirements (I) to (IV), the lower limit of the thickness of the light-absorbing layer 10 is, for example, but not particularly limited to, 40 μm or more.

The transmittance of the light-absorbing layer 10 is, for example, 15% or less at a wavelength of 700 nm. In this case, the optical filter 1a is likely to have high light-shielding performance in the near-infrared region. As a result, the properties of the optical filter 1a are likely to conform to the visual sensitivity of humans. The transmittance of the light-absorbing layer 10 is desirably 12% or less, more desirably 10% or less, and even more desirably 5% or less at a wavelength of 700 nm.

The light-absorbing layer 10 includes, for example, a copper phosphonate and an organic dye. The organic dye typically has a maximum absorption wavelength of 720 nm to 780 nm. The maximum absorption wavelength of the organic dye can be determined, for example, from a light absorption spectrum of a solution containing the organic dye and methanol as a solvent.

Light absorption by a copper phosphonate results from a transition between d orbitals of a copper complex. This transition, which is basically a forbidden transition, is caused by symmetry breaking. Thus, the absorbance attributed to light absorption by a copper phosphonate is low. Therefore, in order to enhance the light absorption performance of an optical filter by means of light absorption by a copper phosphonate, the content of the copper phosphonate in a light-absorbing layer needs to be increased. However, since the amount of a copper phosphonate that can be included in a specific volume of a resin is limited, enhancement of the light absorption performance of an optical filter requires an increase in the thickness of a light-absorbing layer. Contrarily, there is a strong demand for thinner optical filters. Under the circumstances, the present inventors tried to produce a single-layer light-absorbing layer including an organic dye having a narrow absorption wavelength range but capable of exhibiting a strong absorbance and a copper phosphonate unlikely to exhibit a strong absorbance but having a wide absorption wavelength range. It turned out, however, that when the copper phosphonate and the organic dye exist together in the single-layer light-absorbing layer, the organic dye may not be able to sufficiently exhibit its inherent light absorption performance. The present inventors supposed that the effect of a by-product of generation of the copper phosphonate made it impossible for the organic dye to sufficiently exhibit its inherent light absorption performance. Then, through much trial and error, the present inventors have invented a method for appropriately removing a by-product of generation of a copper phosphonate from a light-absorbing composition for forming light-absorbing layers. Even when the light-absorbing layer 10 includes the copper phosphonate and the organic dye, the organic dye can exhibit the appropriate light absorption performance and the light-absorbing layer 10 has the desired transmittance properties.

When the light-absorbing layer 10 includes the copper phosphonate and the organic dye, the light-absorbing layer 10 has a maximum absorption wavelength of, for example, 700 nm to 900 nm in a wavelength range of 650 nm to 1000 nm.

The copper phosphonate is formed of a phosphonic acid and copper ion. The phosphonic acid is not particularly limited. The phosphonic acid is, for example, a phosphonic acid having an alkyl group or an aryl group. The alkyl group may be a linear alkyl group or a branched alkyl group. The number of carbon atoms in the alkyl group is, for example, 2 to 10. The phosphonic acid is, for example, at least one selected from the group consisting of ethylphosphonic acid, propylphosphonic acid, butylphosphonic acid, pentylphosphonic acid, hexylphosphonic acid, heptylphosphonic acid, and octylphosphonic acid. One phosphonic acid or two or more phosphonic acids may be used to form the copper phosphonate.

The organic dye is not limited to a particular one as long as the maximum absorption wavelength thereof is 720 nm to 780 nm. The organic dye is, for example, at least one selected from the group consisting of a phthalocyanine compound, a cyanine compound, a squarylium compound, a diimonium compound, a naphthalocyanine compound, and a croconium compound. The light-absorbing layer 10 may include one organic dye or two or more organic dyes.

The light-absorbing layer 10 further includes, for example, a resin. In the light-absorbing layer 10, the copper phosphonate and the organic dye are included, for example, with the aid of the resin. The resin is not limited to a particular resin as long as, for example, the resin allows the copper phosphonate and the organic dye to be included and has desired durability. The resin is, for example, at least one selected from the group consisting of a polyvinyl acetal resin, a (meth)acrylic resin, a polyester resin, a polyolefin resin, a polycarbonate resin, a polyurethane resin, an epoxy resin, and a norbornene resin. Among these, a polyvinyl acetal resin such as a polyvinyl butyral resin can be desirably used as the resin included in the light-absorbing layer 10.

As shown in FIG. 1A, the optical filter 1a may further include a transparent substrate 20. The light-absorbing layer 10 covers, for example, one principal surface of the transparent substrate 20. The light-absorbing layer 10 may be, for example, in contact with one principal surface of the transparent substrate 20. The transparent substrate 20 has a transmittance of, for example, 80% or more, desirably 85% or more, and more desirably 90% or more in the wavelength range of 400 nm to 700 nm.

The material of the transparent substrate 20 is not limited to any particular material, and the material is, for example, a certain type of glass or resin. When the material of the transparent substrate 20 is a glass, the transparent substrate 20 is, for example, made of a silicate glass such as soda-lime glass or borosilicate glass. The material of the transparent substrate 20 may be an infrared cut glass. The infrared cut glass can be, for example, a phosphate glass or a fluorophosphate glass containing CuO.

When the material of the transparent substrate 20 is a resin, the resin is, for example, a cyclic olefin resin such as a norbornene resin, a polyarylate resin, an acrylic resin, a modified acrylic resin, a polyimide resin, a polyetherimide resin, a polysulfone resin, a polyethersulfone resin, a polycarbonate resin, or a silicone resin.

The light-absorbing layer 10 can be formed, for example, by applying a composition for light-absorbing layers to form a coating film and hardening the coating film. The composition for light-absorbing layers can be prepared by mixing a light-absorbing composition in which the light-absorbing copper phosphonate is dispersed, a liquid containing the organic dye, and a resin. The liquid containing the organic dye can be prepared, for example, by adding the organic dye to a given solvent such as cyclopentanone and stirring the mixture for a given period of time. The resin is any of the resins mentioned as examples of the resin included in the light-absorbing layer 10. The resin may be provided in a form in which the resin is already dissolved in a given solvent such as cyclopentanone.

The light-absorbing composition includes, for example, the above-described copper phosphonate in a dispersed state and an organic solvent. The copper phosphonate can be, for example, a copper phosphonate compound (phosphonic acid copper salt) generated by a reaction between the above-described phosphonic acid and copper ion. The copper ion is supplied, for example, by a copper salt. In this case, an acid derived from the copper salt is generated as a by-product of the generation of the copper phosphonate. In the light-absorbing composition, a concentration of an acid being a by-product of the generation of the copper phosphonate is 1.0 mass % or less. Because of this, in the light-absorbing layer 10 formed using the light-absorbing composition, the organic dye can exhibit good light absorption performance and the light-absorbing layer 10 has the desired transmittance properties. In addition to that, the content of impurities included in the light-absorbing composition decreases. Furthermore, the copper phosphonate is less likely to aggregate and the light-absorbing composition is likely to maintain its low viscosity. The method for determining the concentration of the acid being a by-product in the light-absorbing composition is not particularly limited. The method can be, for example, capillary electrophoresis, liquid chromatography, or ion chromatography.

In the light-absorbing composition, the concentration of the acid being a by-product of the generation of the copper phosphonate may be 1.0 mass % or less or 0.7 mass % or less.

A copper phosphonate-containing layer obtained by applying a mixture of the light-absorbing composition not including any organic dye and the above-described resin to form a coating film and hardening the coating film typically has a sufficiently low average transmittance in the wavelength range of 780 nm to 1080 nm. The average transmittance of the copper phosphonate-containing layer is desirably 5% or less and more desirably 1% or less.

The light-absorbing composition has a viscosity of, for example, 100 mPa·s or less after the light-absorbing composition is stored under an atmospheric pressure environment at 20 to 25° C. for 72 hours. As this indicates, the light-absorbing composition can have a long shelf life.

The average particle diameter of the copper phosphonate in the light-absorbing composition is, for example, 5 nm to 200 nm, may be 10 nm to 150 nm, and can be 15 nm to 125 nm. The average particle diameter of the copper phosphonate in the light-absorbing composition can be determined, for example, by dynamic light scattering.

The light-absorbing composition may include a phosphoric acid ester compound, if necessary. In this case, the copper phosphonate is less likely to aggregate in the light-absorbing composition. The phosphoric acid ester compound is not limited to a particular one, and includes, for example, at least one of a phosphoric acid diester represented by the following formula (c1) and a phosphoric acid monoester represented by the following formula (c2). In the formulae (c1) and (c2), $R_{21}$, $R_{22}$, and $R_3$ are each a monovalent functional group represented by $-(CH_2CH_2O)_nR_4$, wherein n is an integer of 1 to 25 and $R_4$ is an alkyl group having 6 to 25 carbon atoms. $R_{21}$, $R_{22}$, and $R_3$ may be the same or different functional groups.

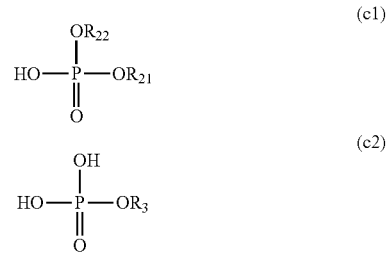

An example of the method for preparing the light-absorbing composition will be described. First, a copper salt is added to a given solvent such as tetrahydrofuran (THF), followed by stirring and, if necessary, filtration to obtain a solution of the copper salt. The copper salt is, for example, copper acetate or a hydrate of copper acetate. Examples of the copper salt may include anhydrides and hydrates of copper chloride, copper formate, copper stearate, copper benzoate, copper pyrophosphate, copper naphthenate, and copper citrate. For example, copper acetate monohydrate is represented by $Cu(CH_3COO)_2 \cdot H_2$, and 1 mol of copper acetate monohydrate supplies 1 mol of copper ion and 2 mol of acetic acid as a by-product. When an anhydride or a hydrate of copper chloride, copper formate, copper stearate, copper benzoate, copper pyrophosphate, copper naphthenate, or copper citrate is used as the copper salt, hydrochloric acid, formic acid, stearic acid, benzoic acid, pyrophosphoric acid, naphthenic acid, or citric acid, respectively, is generated as an acid being a by-product.

Next, a phosphoric acid ester compound such as a phosphoric acid diester represented by the formula (c1) or a phosphoric acid monoester represented by the formula (c2) is added to the solution of the copper salt to prepare a solution A. Separately, the above-described phosphonic acid is added to a given solvent such as an alcohol such as ethanol or methanol or tetrahydrofuran, followed by stirring to prepare a solution B. Next, while the solution A is stirred, the solution B is added to the solution A. The mixture is stirred for a given period of time to generate a copper phosphonate and obtain a solution C. The solution C is subjected to suction filtration to obtain a copper phosphonate solid. The obtained copper phosphonate solid is added to a given solvent such as ethanol, followed by stirring and suction filtration to obtain a purified copper phosphonate solid. After that, the purified copper phosphonate is added to a given solvent such as toluene, hexane, or xylene, followed by stirring to obtain a solution D. Subsequently, the solution D is subjected to solvent removal for a given period of time under heating using an evaporator. A light-absorbing composition can be obtained in this manner. The solvent removal may be performed while the pressure of the environment of the solution D is reduced. In this case, the temperature during the solvent removal can be set low.

The optical filter 1a can be modified in various respects. For example, the optical filter 1a may be modified to an optical filter 1b shown in FIG. 1B. The optical filter 1b is configured in the same manner as the optical filter 1a, unless otherwise described. The description given for the optical filter 1a can apply to the optical filter 1b, unless there is technical inconsistency.

Figure 1B:
FIG. 1B is a cross-sectional view showing an optical filter according to another example of an embodiment of the present invention.

As shown in FIG. 1B, the optical filter 1b is composed only of the light-absorbing layer 10. The optical filter 1b therefore tends to be thin. The optical filter 1b can be produced, for example, by applying the above-described composition for light-absorbing layers to a given substrate to form a coating film, hardening the coating film into the light-absorbing layer 10, and separating the light-absorbing layer 10 from the substrate. The substrate can be a glass substrate, a resin substrate, a metal substrate, or a ceramic substrate. The substrate is desirably a substrate having a fluorine-coated surface. In this case, the light-absorbing layer 10 is easily separated from the substrate.

The optical filter 1a or 1b may further include, if necessary, at least one selected from the group consisting of a light-absorbing layer other than the light-absorbing layer 10, an infrared reflecting film, and an antireflection film. The infrared reflecting film is, for example, a film composed of alternately laminated different materials having different refractive indices. The material forming the infrared reflecting film is, for example, an inorganic material such as $SiO_2$, $TiO_2$, and $MgF_2$ or an organic material such as a fluorine resin. The anti-reflection film is formed as an interface between the optical filter and air and is, for example, a film for reducing reflection of visible light. The anti-reflection film can be formed, for example, of a dielectric made of a resin, an oxide, a fluoride, or the like. The anti-reflection film may be a multilayer film formed by laminating two or more types of dielectrics having different refractive indices. In particular, the anti-reflection film may be a dielectric multilayer film made of a low-refractive-index material such as $SiO_2$ and a high-refractive-index material such as $TiO_2$ or $Ta_2O_5$. In this case, Fresnel reflection at the interface between the optical filter and air is reduced and the amount of visible light passing through the optical filter can be increased.

Figure 2:
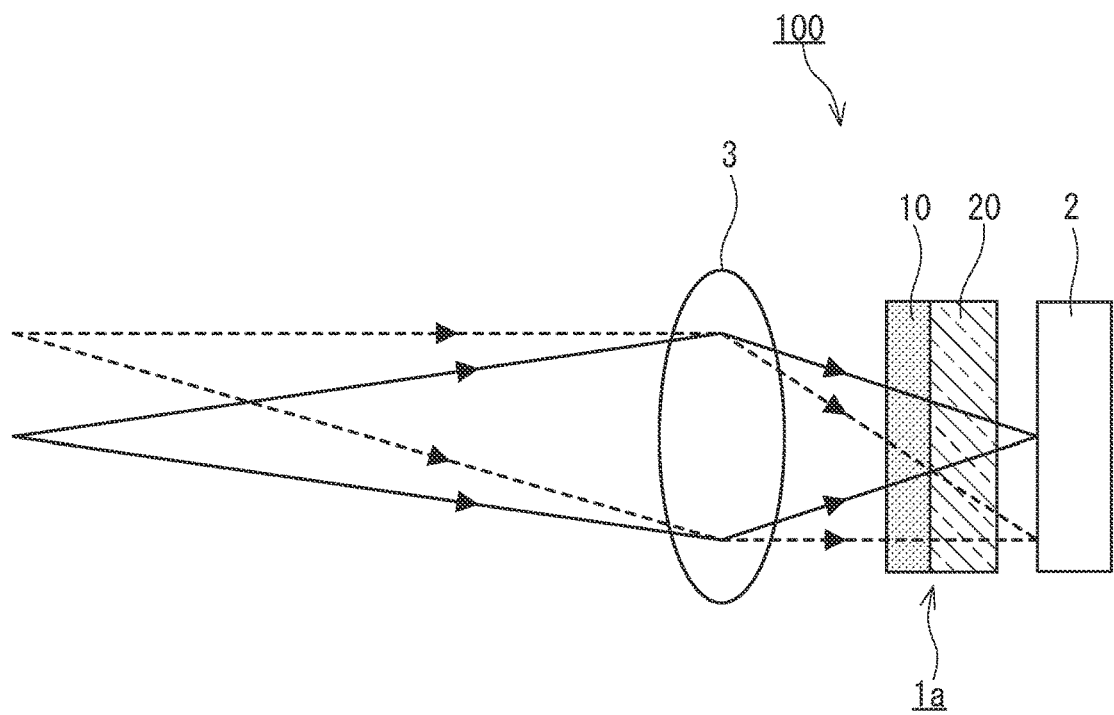
FIG. 2 is a cross-sectional view showing an imaging optical system including an optical filter according to an example of an embodiment of the present invention.
Figure 3:
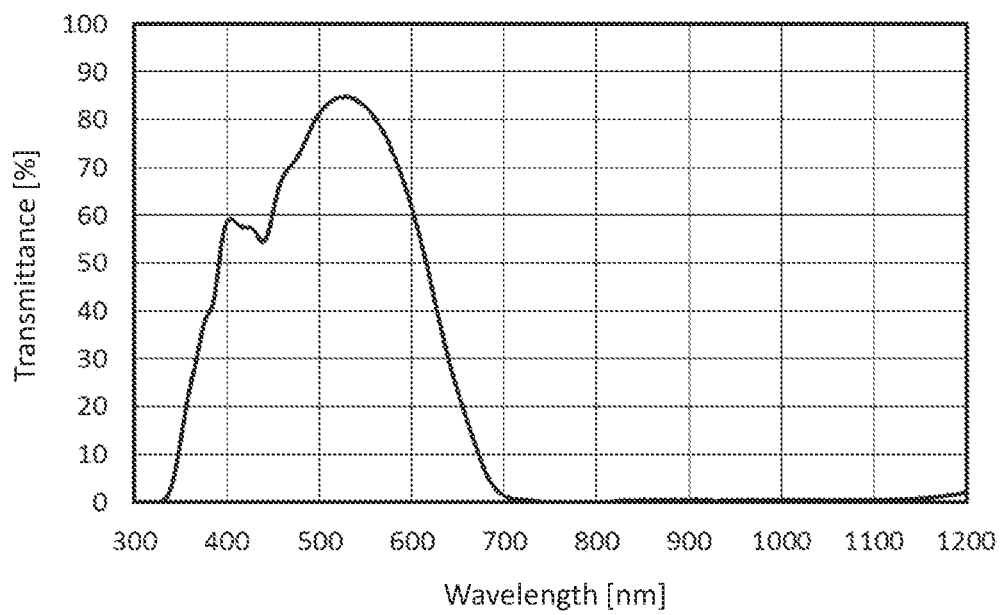
FIG. 3 shows a transmittance spectrum of an optical filter according to Example 1.
Figure 4:
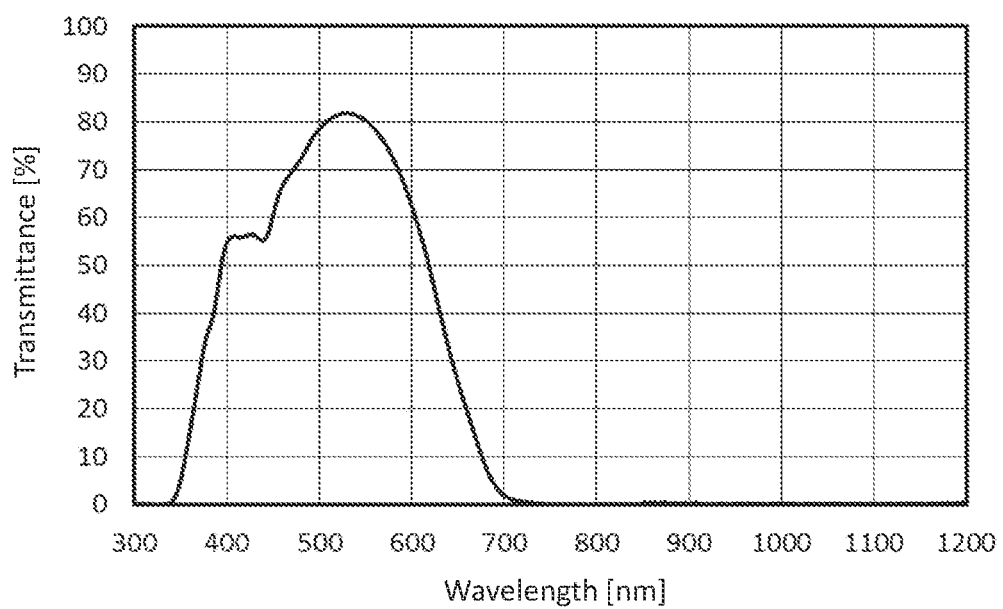
FIG. 4 shows a transmittance spectrum of an optical filter according to Example 2.
Figure 5:
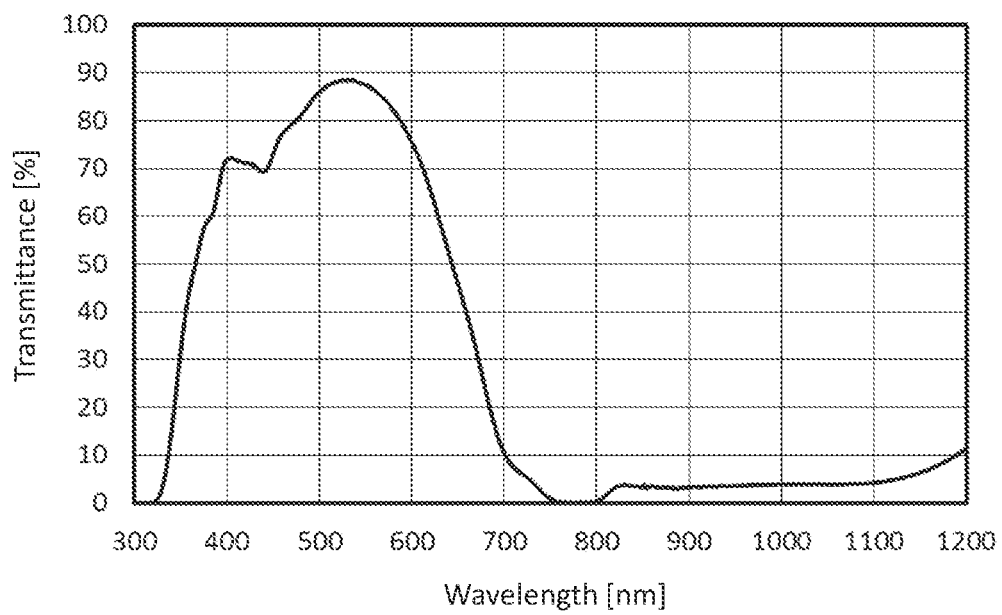
FIG. 5 shows a transmittance spectrum of an optical filter according to Example 3.
Figure 6:
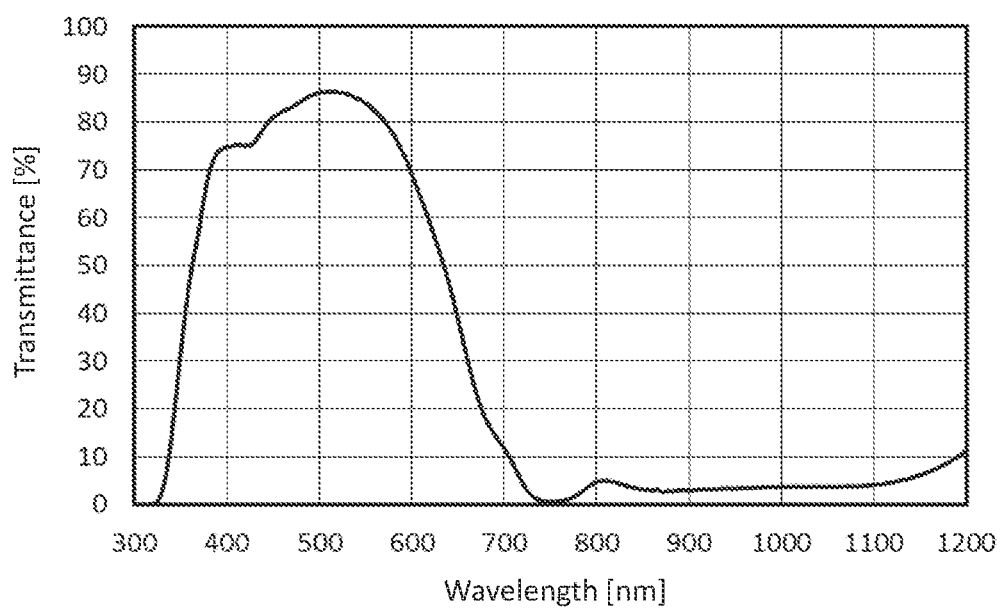
FIG. 6 shows a transmittance spectrum of an optical filter according to Example 4.
Figure 7:
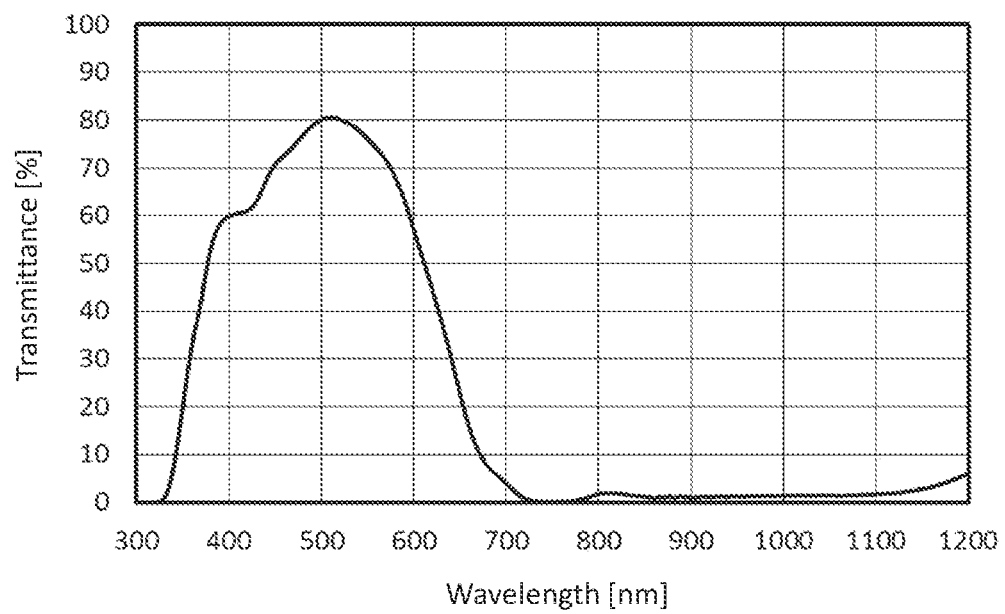
FIG. 7 shows a transmittance spectrum of an optical filter according to Example 5.
Figure 8:
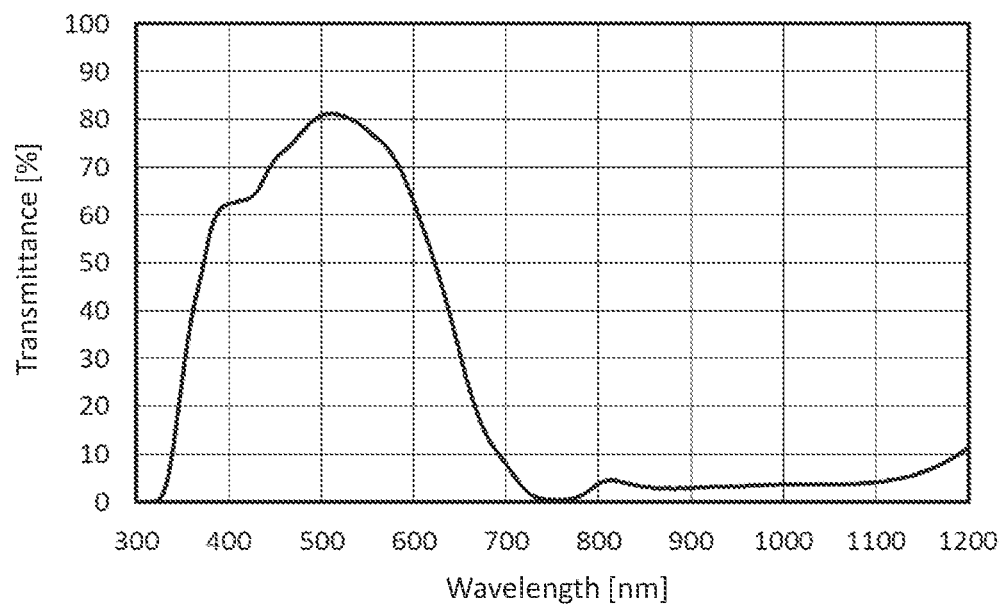
FIG. 8 shows a transmittance spectrum of an optical filter according to Example 6.
Figure 9:
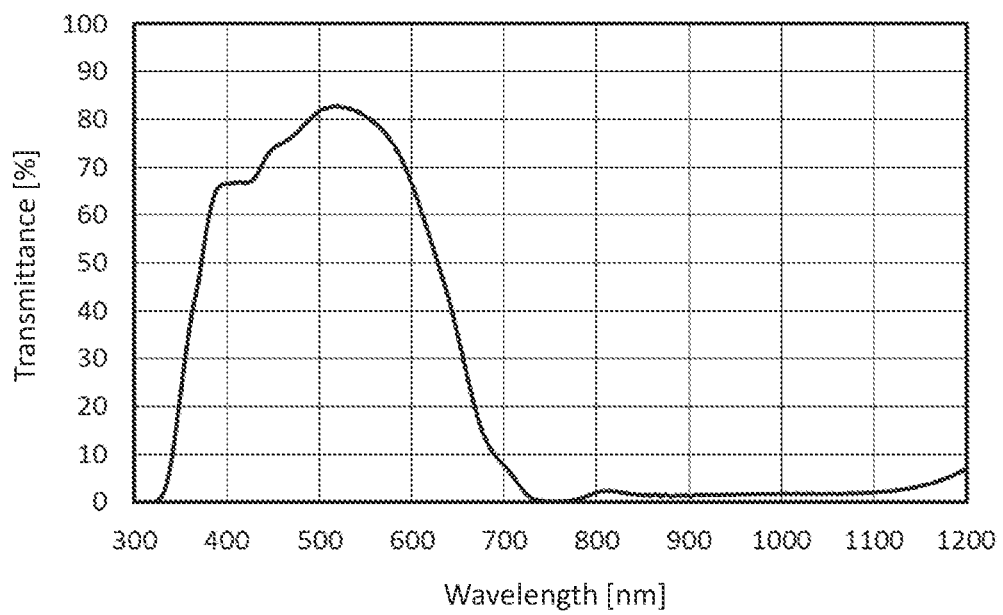
FIG. 9 shows a transmittance spectrum of an optical filter according to Example 7.
Figure 10:
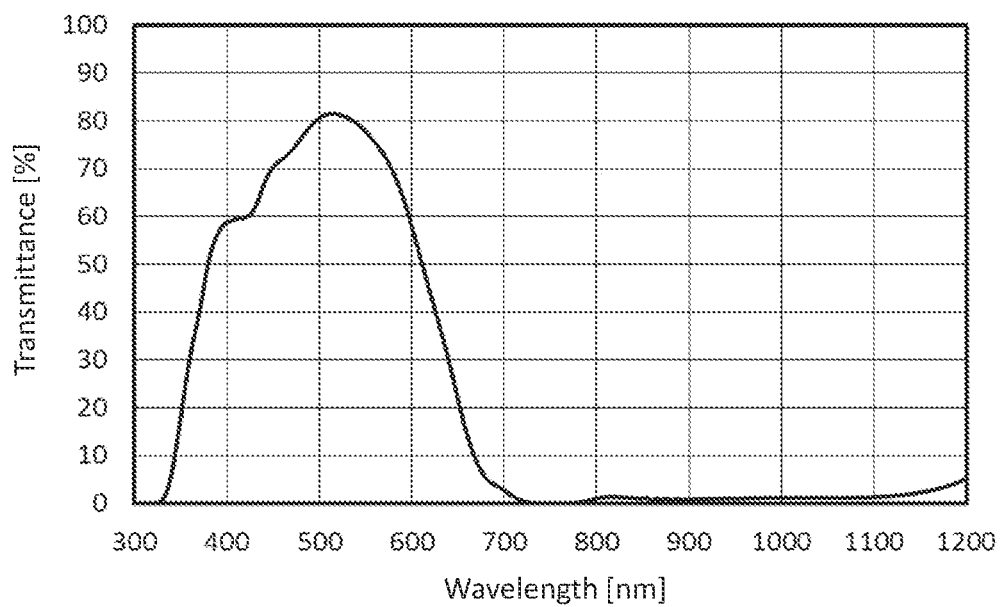
FIG. 10 shows a transmittance spectrum of an optical filter according to Example 8.
Figure 11:
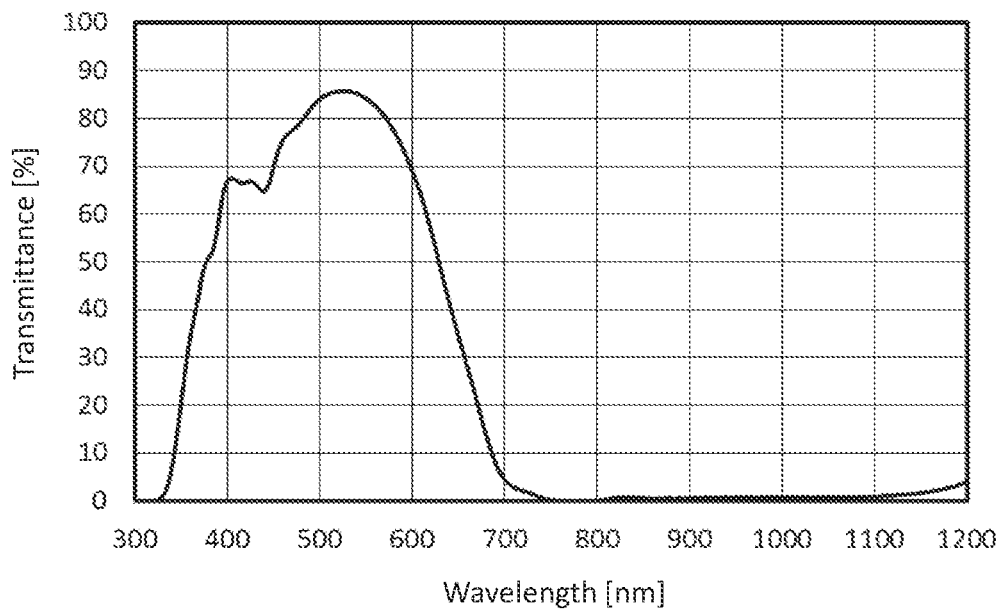
FIG. 11 shows a transmittance spectrum of an optical filter according to Example 9.
Figure 12:
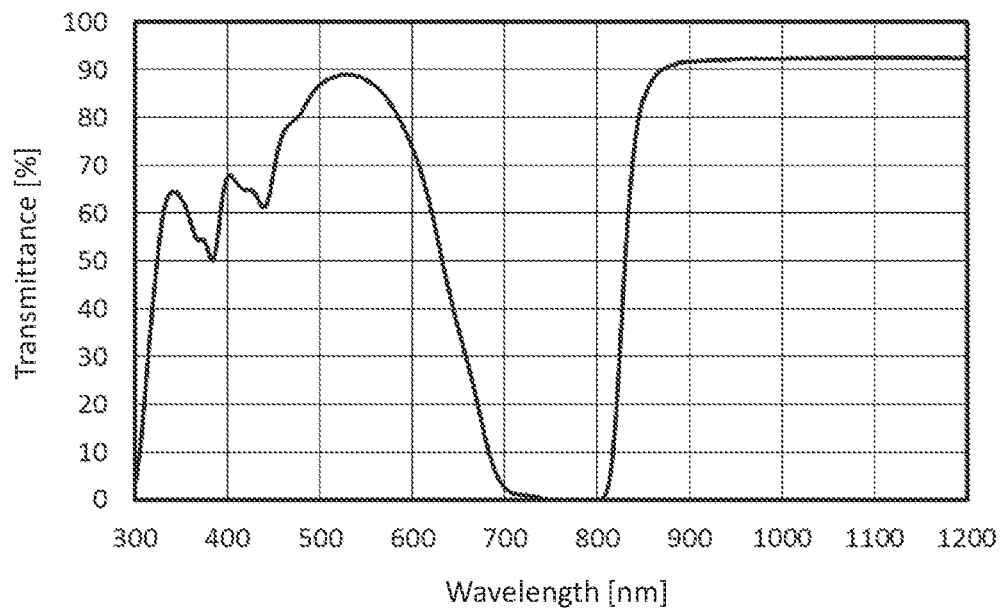
FIG. 12 shows a transmittance spectrum of an optical filter according to Comparative Example 1.
Figure 13:
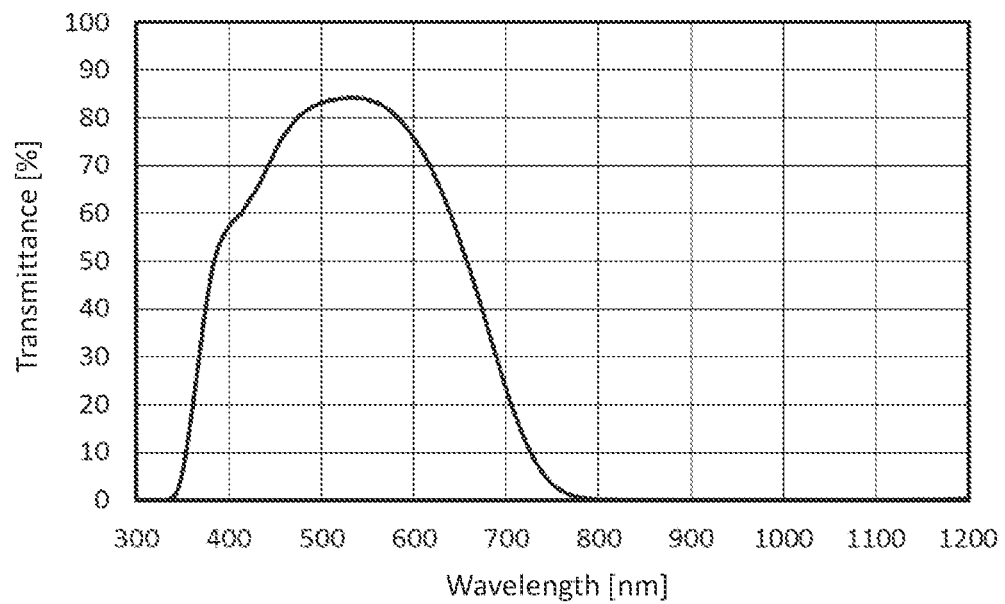
FIG. 13 shows a transmittance spectrum of an optical filter according to Comparative Example 2.
Figure 14:
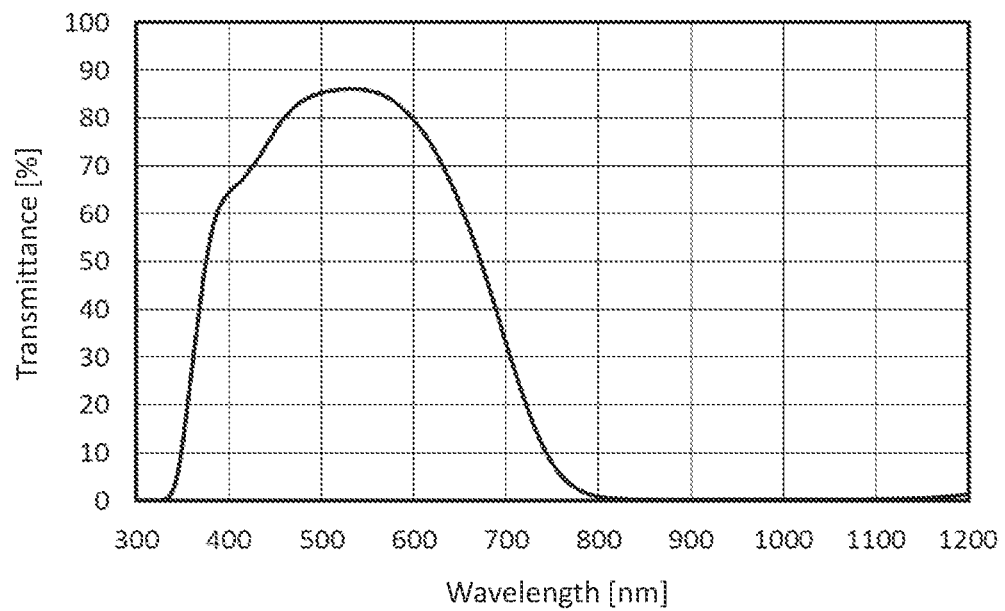
FIG. 14 shows a transmittance spectrum of an optical filter according to Comparative Example 3.
Figure 15:
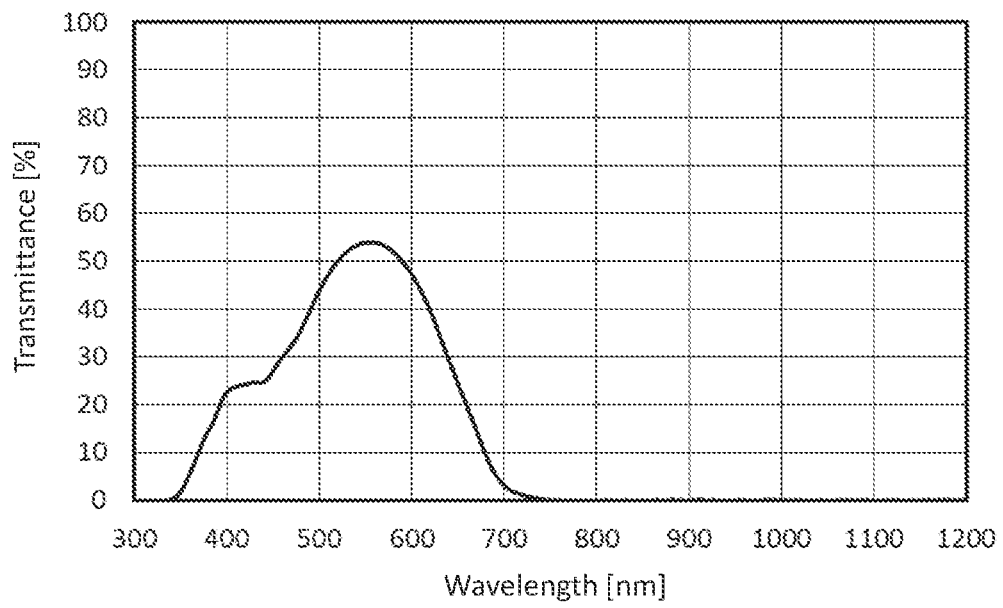
FIG. 15 shows a transmittance spectrum of an optical filter according to Comparative Example 4.
Figure 16:
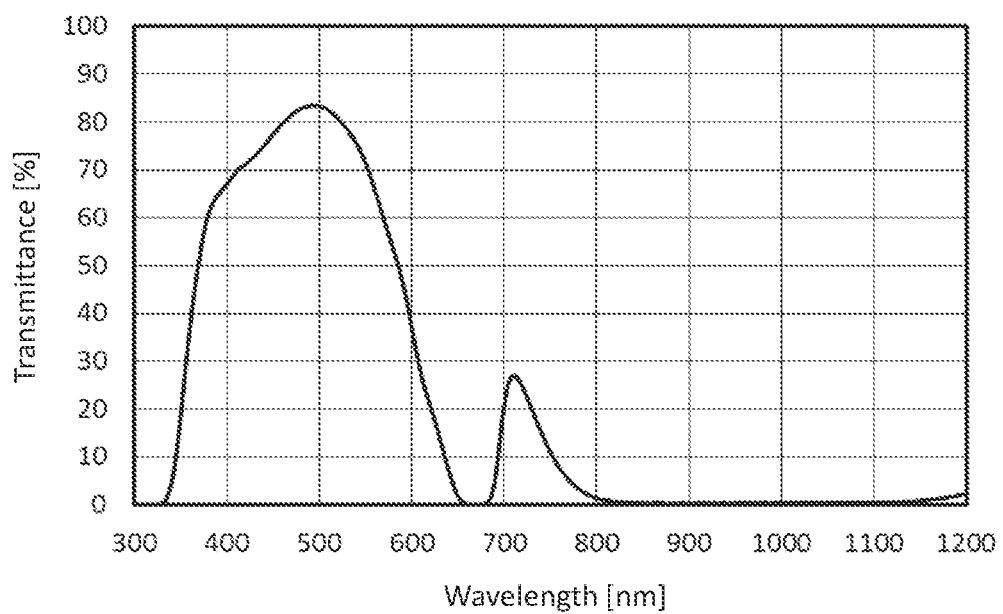
FIG. 16 shows a transmittance spectrum of an optical filter according to Comparative Example 5.

For example, as shown in FIG. 2, an imaging optical system 100 can be provided by the use of the optical filter 1a. In addition to the optical filter 1a, the imaging optical system 100 further includes, for example, an imaging lens 3. The imaging optical system 100 is disposed ahead of an imaging sensor 2 in an imaging apparatus such as a digital camera. The imaging sensor 2 is, for example, a solid-state imaging sensor such as a CCD or a CMOS. As shown in FIG. 2, light coming from an object is focused by the imaging lens 3, the ultraviolet and infrared portions of the light are cut by the optical filter 1a, and then the light is incident on the imaging sensor 2. Thus, the spectral sensitivity of the imaging sensor 2 approximates to the visual sensitivity of humans, and a favorable image with good color reproduction can be obtained. The imaging optical system 100 may include the optical filter 1b instead of the optical filter 1a or in addition to the optical filter 1a.

EXAMPLES

Example 1

(Preparation of Light-Absorbing Composition)

5.86 g of copper acetate monohydrate (manufactured by KANTO CHEMICAL CO., INC.) and 234.14 g of ethanol (manufactured by KANTO CHEMICAL CO., INC.; EL Grade for the electronics industry) were mixed and stirred for 1 hour, followed by filtration using a filter (manufactured by Merck Millipore; product name: Millex; model number: SLLHH25NS; pore diameter: 0.45 μm; diameter: 25 mm) to obtain a copper acetate solution. To 200 g of the copper acetate solution was then added 2.572 g of a phosphoric acid ester compound (manufactured by DKS Co., Ltd.; product name: PLYSURF A208N), followed by stirring for 30 minutes to obtain a solution A. 40 g of ethanol was added to 2.886 g of n-butylphosphonic acid (manufactured by Johoku Chemical Co., Ltd.), followed by stirring for 10 minutes to obtain a solution B. Next, the solution B was added to the solution A while the solution A was stirred. The mixture was stirred at room temperature for 15 minutes to cause a reaction and obtain a solution C. A solid (hereinafter referred to as a copper phosphonate solid) including a phosphonic acid and copper ion and considered to have been generated by the reaction was precipitated in the solution C. The solution C was subjected to suction filtration to obtain the copper phosphonate solid. The obtained copper phosphonate solid was added to 200 g of ethanol, followed by stirring at room temperature for 10 minutes. Suction filtration was performed again to obtain a purified copper phosphonate solid. Then, the purified copper phosphonate was added to 140 g of toluene, followed by stirring at room temperature for 1 minute to obtain a solution D. In the solution D, the copper phosphonate solid was not visible and the copper phosphonate was in a dispersed state. This indicates that a certain amount of a phosphoric acid ester having the dispersing effect was included in the copper phosphonate solid and the phosphoric acid ester contributed to the dispersion of the copper phosphonate in the toluene. The solution D was placed in a flask and subjected to solvent removal using a rotary evaporator (manufactured by Tokyo Rikakikai Co., Ltd.; product code: N-1110SF) under heating by means of an oil bath (manufactured by Tokyo Rikakikai Co., Ltd.; product code: OSB-2100) set at 105° C. As a result, 94.606 g of a dispersion liquid of copper butylphosphonate which is a light-absorbing copper complex was obtained as a light-absorbing composition. It is thought that in this process, acetic acid was generated as a by-product of the generation of the copper phosphonate because of the use of copper acetate. However, the obtained copper phosphonate and dispersion liquid of the copper phosphonate did not have the distinctive smell of acetic acid, which suggests that the acetic acid had been fully removed.

(Evaluation of Light-Absorbing Composition)

Pure water was added to the light-absorbing composition immediately after the preparation to perform liquid-liquid extraction. An aqueous layer was collected to prepare a measurement specimen for capillary electrophoresis (CE).

Capillary electrophoresis was performed for the measurement specimen for CE according to an indirect absorptiometric method using a CE system (manufactured by Agilent Technologies, Inc.; product name: Agilent 1600). In the capillary electrophoresis, a 2,6-pyridinedicarboxylic acid-based electrophoresis solution (pH: 12) and a capillary made of fused silica were used. The concentration of acetic acid in the light-absorbing composition immediately after the preparation turned out to be 0.20 mass %.

The viscosity of the light-absorbing composition immediately after the preparation was measured using a rotational viscometer (manufactured by SEKONIC CORPORATION; product name: PR-10-L/VM-10A). The viscosity thereof turned out to be 0.89 mPa·s. The average particle diameter of the copper phosphonate in the light-absorbing composition immediately after the preparation was measured according to dynamic light scattering using a particle diameter measurement system (manufactured by Otsuka Electronics Co., Ltd.; product name: ELSZ-2000). The average particle diameter thereof turned out to be 29 nm. The viscosity of the light-absorbing composition stored after the preparation for 27 days under an atmospheric pressure environment at 20 to 25° C. and the average particle diameter of the copper phosphonate therein were measured in the same manner. The viscosity turned out to be 1.54 mPa·s, and the average particle diameter of the copper phosphonate turned out to be 105 nm. In the light-absorbing composition stored after the preparation for 27 days under the atmospheric pressure environment at 20 to 25° C., even slight precipitation and aggregation of the copper phosphonate were not found, and it was confirmed that the light-absorbing composition maintained such quality that an optical filter was able to be formed with the light-absorbing composition without any trouble. On the other hand, a portion of the solution C which was the dispersion liquid of the copper phosphonate was stored as it was under an atmospheric pressure environment at 0 to 25° C., and a jelly-like substance having a high viscosity was obtained after 4 days of storage. This jelly-like substance did not return to the original liquid state by stirring. It should be added that immediately after the start of the storage, the solution C looked the same as the above light-absorbing composition. It is thought that the acetic acid as the by-product was not completely removed from the solution C, and that caused aggregation of the copper phosphonate and turned the solution C into the jelly-like substance.

(Preparation of Organic Dye-Containing Solution)

0.1 g of an organic dye (manufactured by QCR Solutions Corp; product name: NIR768A; maximum absorption wavelength: 768 nm) was weighed out. To the organic dye was added 20 g of cyclopentanone, followed by stirring for 30 minutes to obtain an "organic dye-containing solution <1>". Organic dye-containing solutions <2> to <6> were prepared in the same manner as for the organic dye-containing solution <1>, except that the type of the organic dye and the amount of cyclopentanone added were adjusted as shown in Table 1. NIR740C is an organic dye manufactured by QCR Solutions Corp, and DLS 740D, DLS 740E, DLS 744A, and DLS 745B are organic dyes manufactured by Crysta-Lyn Chemical Company. The maximum absorption wavelength of each organic dye was determined from a light absorption spectrum of a methanol solution of the organic dye.

(Preparation of Composition for Light-Absorbing Layers)

3 g of a polyvinyl butyral resin (manufactured by SEKISUI CHEMICAL CO., LTD.; product name: S-LEC KS-10) and 30 g of cyclopentanone were mixed and stirred for 8 hours to obtain a "PVB solution". 0.2 g of the PVB solution, 0.2 g of the organic dye-containing solution <1>, 2 g of cyclopentanone, and 1.5 g of toluene were mixed to obtain a liquid mixture, which was stirred for 30 minutes. Then, 6.15 g of the above light-absorbing composition was added to the liquid mixture, followed by stirring for 10 more minutes to obtain a composition for light-absorbing layers according to Example 1. Table 2 shows the contents of the components in the composition for light-absorbing layers according to Example 1. In the composition for light-absorbing layers according to Example 1, the ratio of the content of copper to the content of the organic dye (content of copper/content of the organic dye) was 102 on a mass basis. In the composition for light-absorbing layers according to Example 1, the ratio of the content of the phosphonic acid to the content of the organic dye (content of the phosphonic acid/content of the organic dye) was 189 on a mass basis.

(Production of Optical Filter)

The composition for light-absorbing layers according to Example 1 was applied with a dispenser to a 30 mm×30 mm region of a transparent glass substrate (manufactured by SCHOTT AG; product name: D 263 T eco) made of borosilicate glass and having dimensions of 76 mm×76 mm×0.21 mm to form a coating film, which was baked in a heating oven at 45° C. for 2 hours and then at 85° C. for 0.5 hours to harden the composition for light-absorbing layers. An optical filter according to Example 1 including a light-absorbing layer was obtained in this manner. The light-absorbing layer of the optical filter according to Example 1 had a thickness of 81 μm. The thickness of the light-absorbing layer were determined by measuring the distance between the surface of the light-absorbing layer and the interface between the light-absorbing layer and the glass substrate using a laser displacement meter LK-H008 manufactured by Keyence Corporation.

Example 2

A composition for light-absorbing layers according to Example 2 was obtained in the same manner as in Example 1, except that the amount of the PVB solution added was changed to 0.40 g in the preparation of the composition for light-absorbing layers.

0.1 g of OPTOOL DSX (concentration of active ingredient: 20%) manufactured by DAIKIN INDUSTRIES, LTD. and 19.9 g of Novec 7100 (hydrofluoroether) manufactured by 3M Company were mixed and stirred for 5 minutes to produce a fluorine treatment agent (concentration of active ingredient: 0.1%). The fluorine treatment agent was applied to a 30 mm×30 mm region of a transparent glass substrate (manufactured by SCHOTT AG; product name: D 263 T eco) made of borosilicate glass and having dimensions of 76 mm×76 mm×0.21 mm by spin coating at a rotational speed of 3000 rpm (revolutions per minute). The coating film was then left at room temperature for 24 hours to obtain a fluorine-coated substrate.

The composition for light-absorbing layers according to Example 2 was applied onto the above fluorine-coated substrate to form a coating film, which was baked in a heating oven at 45° C. for 2 hours and then at 85° C. for 0.5 hours to harden the composition for light-absorbing layers. A light-absorbing layer was obtained in this manner. Then, the light-absorbing layer was peeled off from the fluorine-coated substrate to obtain an optical filter according to Example 2 composed only of the light-absorbing layer. The light-absorbing layer of the optical filter according to Example 2 had a thickness of 119 μm.

Examples 3 to 8

Compositions for light-absorbing layers according to Examples 3 to 8 were obtained in the same manner as in Example 1, except that the type of the organic dye and the contents of the components were adjusted as shown in Table 1 and Table 2 in the preparation of the compositions for light-absorbing layers.

Optical filters according to Examples 3 to 8 were obtained in the same manner as in Example 1, except that the compositions for light-absorbing layers according to Examples 3 to 8 were used instead of the composition for light-absorbing layers according to Example 1 in the production of the optical filters.

Example 9

(Preparation of Light-Absorbing Composition)

5.86 g of copper acetate monohydrate and 234.14 g of ethanol were mixed and stirred for 1 hour, followed by filtration using a filter (manufactured by Merck Millipore; product name: Millex; model number: SLLHH25NS; pore diameter: 0.45 μm; diameter: 25 mm) to obtain a copper acetate solution. To 200 g of the copper acetate solution was then added 2.572 g of a phosphoric acid ester compound (manufactured by DKS Co., Ltd.; product name: PLYSURF A208N), followed by stirring for 30 minutes to obtain a solution A. 40 g of ethanol was added to 2.296 g of ethylphosphonic acid (manufactured by Johnson Matthey plc), followed by stirring for 10 minutes to obtain a solution B. Next, the solution B was added to the solution A while the solution A was stirred. The mixture was stirred at room temperature for 15 minutes to cause a reaction and obtain a solution C. A solid (hereinafter referred to as a copper phosphonate solid) including a phosphonic acid and copper ion and considered to have been generated by the reaction was precipitated in the solution C. The solution C was subjected to suction filtration to obtain the copper phosphonate solid. The obtained copper phosphonate solid was added to 200 g of ethanol, followed by stirring at room temperature for 10 minutes. Suction filtration was performed again to obtain a purified copper phosphonate solid. Then, the purified copper phosphonate was added to 90 g of toluene, followed by stirring at room temperature for 1 minute to obtain a solution D. In the solution D, the copper phosphonate solid was not visible and the copper phosphonate was in a dispersed state. This indicates that a certain amount of a phosphoric acid ester having the dispersing effect was included in the copper phosphonate solid and the phosphoric acid ester contributed to the dispersion of the copper phosphonate in the toluene. The solution D was placed in a flask and subjected to solvent removal using a rotary evaporator under heating by means of an oil bath set at 105° C. As a result, 82.080 g of a dispersion liquid of copper ethylphosphonate which is a light-absorbing copper complex was obtained as a light-absorbing composition. As in the case of the copper phosphonate according to Example 1 and the dispersion liquid of the copper phosphonate according to Example 1, the copper phosphonate according to Example 9 and the dispersion liquid of the copper phosphonate according to Example 9 did not have the distinctive smell of acetic acid, which suggests that the acetic acid had been fully removed. The copper phosphonate dispersion according to Example 9 had a viscosity of 0.84 mPa·s.

(Preparation of Composition for Light-Absorbing Layers)

3 g of a polyvinyl butyral resin (S-LEC KS-10) and 30 g of cyclopentanone were mixed and stirred for 8 hours to obtain a "PVB solution". 0.2 g of the PVB solution, 0.2 g of the organic dye-containing solution <1>, 2 g of cyclopentanone, and 1.5 g of toluene were mixed to obtain a liquid mixture, which was stirred for 30 minutes. Then, 5.34 g of the above light-absorbing composition was added to the liquid mixture, followed by stirring for 10 more minutes to obtain a composition for light-absorbing layers according to Example 9. Table 2 shows the contents of the components in the composition for light-absorbing layers according to Example 9. In the composition for light-absorbing layers according to Example 9, the ratio of the content of copper to the content of the organic dye (content of copper/content of the organic dye) was 102 on a mass basis. In the composition for light-absorbing layers according to Example 9, the ratio of the content of the phosphonic acid to the content of the organic dye (content of the phosphonic acid/content of the organic dye) was 150 on a mass basis.

(Production of Optical Filter)

An optical filter according to Example 9 was obtained in the same manner as in Example 1, except that the composition for light-absorbing layers according to Example 9 was used instead of the composition for light-absorbing layers according to Example 1.

Comparative Example 1

A composition for light-absorbing layers according to Comparative Example 1 was prepared in the same manner as in Example 1, except that the light-absorbing composition which is a dispersion liquid of a copper phosphonate and toluene were not added in the preparation of the composition for light-absorbing layers. An optical filter according to Comparative Example 1 was obtained in the same manner as in Example 1, except that the composition for light-absorbing layers according to Comparative Example 1 was used instead of the composition for light-absorbing layers according to Example 1 in the production of the optical filter.

Comparative Example 2

A composition for light-absorbing layers according to Comparative Example 2 was prepared in the same manner as in Example 1, except that the organic dye-containing solution <1> was not added in the preparation of the composition for light-absorbing layers. An optical filter according to Comparative Example 2 was obtained in the same manner as in Example 1, except that the composition for light-absorbing layers according to Comparative Example 2 was used instead of the composition for light-absorbing layers according to Example 1 in the production of the optical filter. The light-absorbing layer of the optical filter according to Comparative Example 2 had a thickness of 130 μm.

Comparative Example 3

A composition for light-absorbing layers according to Comparative Example 3 was prepared in the same manner as in Example 1, except that the organic dye-containing solution <1> was not added in the preparation of the composition for light-absorbing layers. An optical filter according to Comparative Example 3 was obtained in the same manner as in Example 1, except that the composition for light-absorbing layers according to Comparative Example 3 was used instead of the composition for light-absorbing layers according to Example 1 in the production of the optical filter. The light-absorbing layer of the optical filter according to Comparative Example 3 had a thickness of 96 μm.

Comparative Example 4

A composition for light-absorbing layers according to Comparative Example 4 was prepared in the same manner as in Example 1, except that the addition of the obtained copper phosphonate solid to 200 g of ethanol, the stirring at room temperature for 10 minutes, and the suction filtration were omitted. The concentration of acetic acid in the light-absorbing composition according to Comparative Example 4 immediately after the preparation was determined by capillary electrophoresis in the same manner as for the light-absorbing composition according to Example 1. The concentration of acetic acid in the light-absorbing composition according to Comparative Example 4 turned out to be 3.20 mass %. After that, an optical filter according to Comparative Example 4 was obtained in the same manner as in Example 1, except that the light-absorbing composition according to Comparative Example 4 was used instead of the light-absorbing composition according to Example 1. The light-absorbing layer of the optical filter according to Comparative Example 4 had a thickness of 118 μm.

Comparative Example 5

A composition for light-absorbing layers according to Comparative Example 5 was prepared in the same manner as in Example 1, except that an organic dye-containing solution <7> in an amount shown in Table 2 was used instead of 0.2 g of the organic dye-containing solution <1> in the preparation of the composition for light-absorbing layers. An optical filter according to Comparative Example 5 was obtained in the same manner as in Example 1, except that the composition for light-absorbing layers according to Comparative Example 5 was used instead of the composition for light-absorbing layers according to Example 1 in the production of the optical filter. The light-absorbing layer of the optical filter according to Comparative Example 5 had a thickness of 77 μm. S 2084 is an organic dye manufactured by FEW Chemicals GmbH.

(Optical Properties of Optical Filter)

Figure 17:
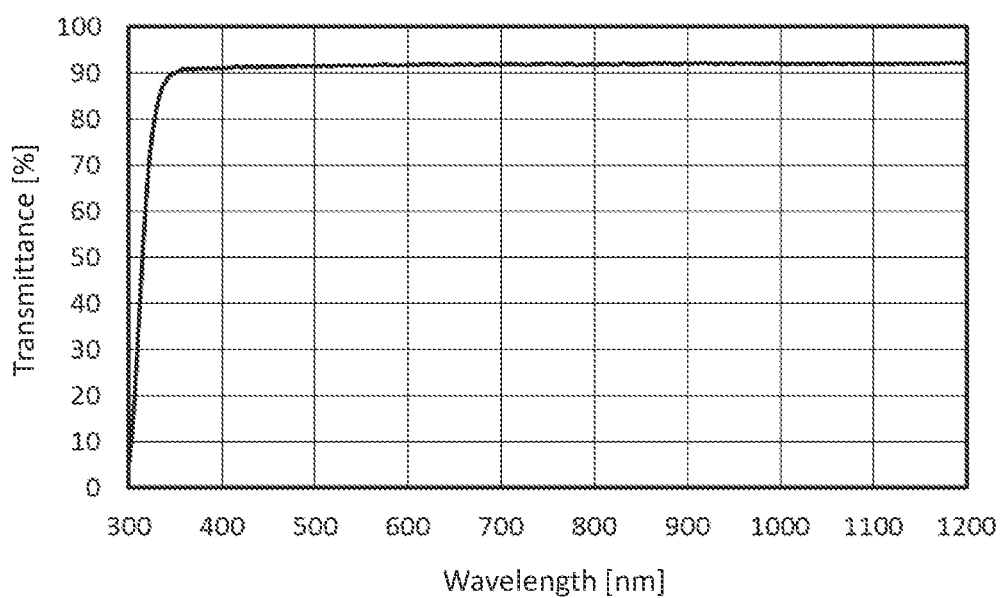
FIG. 17 shows a transmittance spectrum of a transparent glass substrate (manufactured by SCHOTT AG; product name: D263 T eco).

The optical filters according to Examples and Comparative Examples were measured for transmittance spectra at an incident angle of 0° using an ultraviolet/visible/near-infrared spectrophotometer (manufactured by JASCO Corporation; product name: V670). For the optical filters according to Examples 1 to 9, the maximum transmittance in the wavelength range of 750 to 1080 nm is 5% or less, the maximum transmittance in the wavelength range of 800 to 950 nm is 5% or less, and the maximum transmittance in the wavelength range of 800 to 1000 nm is 5% or less. Moreover, for the optical filters according to Examples 1 to 9, the maximum transmittance in the wavelength range of 1000 to 1100 nm is 4.28% or less, and the maximum transmittance in the wavelength range of 1100 to 1200 nm is 11.44% or less. Furthermore, for the optical filters according to Examples 1 to 9, the IR cut-off wavelength is 611 to 644 nm, and the UV cut-off wavelength is 362 to 394 nm. The light-absorbing layers thereof have a maximum absorption wavelength of 750 to 780 nm. FIGS. 3 to 11 respectively show the transmittance spectra of the optical filters according to Examples 1 to 9. FIGS. 12 to 16 respectively show the transmittance spectra of the optical filters according to Comparative Examples 1 to 5. Table 3 shows property values obtained from the transmittance spectra shown in FIGS. 3 to 16. The optical filters according to Examples 1 and 2 have good optical properties satisfying the above requirements (i) to (iv), which suggests that the optical filters according to Examples 1 and 2 will exhibit good properties when used as light-absorbing optical filters. Table 4 shows the spectral transmittance of the above transparent glass substrate alone, and FIG. 17 shows a transmittance spectrum of the above transparent glass substrate. As to Example 1, the transmittance spectrum of the transparent glass substrate alone suggests that the light-absorbing layer of the optical filter according to Example 1 satisfies the above requirements (i) to (iv). The optical filters according to Examples 3 to 9 have good optical properties satisfying the above requirements (I) to (IV), which suggests that the optical filters according to Examples 3 to 9 will exhibit good properties when used as light-absorbing optical filters. As to Examples 3 to 9, the transmittance spectrum of the transparent glass substrate alone suggests that the light-absorbing layers of the optical filters according to Examples 3 to 9 satisfy the above requirements (I) to (IV).

The light-absorbing layer of the optical filter according to Comparative Example 1 does not include a copper phosphonate and includes the organic dye as its only light absorber. Therefore, the optical filter according to Comparative Example 1 does not sufficiently absorb infrared light in a broad wavelength range and cannot satisfy the above requirements (ii) and (iv). The light-absorbing layer of the optical filter according to Comparative Example 2 includes the copper phosphonate as its only light absorber. Because of this, the optical filter according to Comparative Example 2 cannot sufficiently absorb infrared light in the wavelength range of 600 nm to 780 nm and cannot satisfy the above requirement (ii) although having a thickness of 130 μm. The light-absorbing layer of the optical filter according to Comparative Example 3 includes the copper phosphonate as its only light absorber. Because of this, the optical filter according to Comparative Example 3 cannot sufficiently absorb infrared light in the wavelength range of 600 to 780 nm and cannot satisfy the above requirement (ii) although having a thickness of 96 μm. The optical filter according to Comparative Example 5 includes the organic dye having a maximum absorption wavelength out of the wavelength range of 720 nm to 780 nm (669 nm) and therefore cannot satisfy the above requirement (iii).

Comparison between the concentration of acetic acid in the light-absorbing composition according to Example 1 and the concentration of acetic acid in the light-absorbing composition according to Comparative Example 4 suggests that the purification treatment in which the addition of ethanol to the copper phosphonate solid and the filtration are combined can efficiently remove the acetic acid being the by-product. Additionally, the optical filter according to Comparative Example 4 cannot satisfy the above requirement (i). This is presumably because, in the process of producing the composition for light-absorbing layers or the process of heat-treating the substrate after the application of the composition for light-absorbing layers thereto, the effect of the acetic acid remaining in the light-absorbing composition according to Comparative Example 4 caused decomposition of a portion of a functional group of the organic dye or changed the bonding state of the functional group, and thereby the organic dye changed its state so as to have absorption in the visible region.

TABLE 1

| Organic dye-containing solution | Organic dye Product name | Maximum absorption wavelength [nm] | Amount Organic dye [g] | Amount Cyclopentanone [g] |
|---|---|---|---|---|
| <1> | NIR768A | 768 | 0.10 | 20.00 |
| <2> | NIR740C | 740 | 0.10 | 20.00 |
| <3> | DLS 740D | 740 | 0.10 | 20.00 |
| <4> | DLS 740E | 740 | 0.10 | 20.00 |
| <5> | DLS 744A | 744 | 0.10 | 40.00 |
| <6> | DLS 745B | 745 | 0.10 | 20.00 |
| <7> | S 2084 | 668 | 0.10 | 400.00 |

TABLE 2

Materials of composition for light-absorbing layers and amount thereof

| | Organic dye-containing solution Type of organic dye-containing solution | Amount [g] | PVB solution [g] | Cyclo-pentanone [g] | Toluene [g] | Light-absorbing composition [g] |
|---|---|---|---|---|---|---|
| Example 1 | <1> | 0.20 | 0.20 | 2.00 | 1.50 | 6.15 |
| Example 2 | <1> | 0.20 | 0.40 | 2.00 | 1.50 | 6.15 |
| Example 3 | <1> | 0.20 | 0.20 | 2.00 | 1.50 | 6.15 |
| Example 4 | <2> | 0.20 | 0.20 | 2.00 | 1.50 | 6.15 |
| Example 5 | <3> | 0.20 | 0.20 | 2.00 | 1.50 | 6.15 |
| Example 6 | <4> | 0.20 | 0.20 | 2.00 | 1.50 | 6.15 |
| Example 7 | <5> | 0.40 | 0.20 | 2.00 | 1.50 | 6.15 |
| Example 8 | <6> | 0.20 | 0.20 | 2.00 | 1.50 | 6.15 |
| Example 9 | <1> | 0.20 | 0.20 | 2.00 | 1.50 | 5.34 |
| Comparative Example 1 | <1> | 0.20 | 0.20 | 2.00 | 0 | 0 |
| Comparative Example 2 | — | 0 | 0.20 | 2.00 | 1.50 | 6.15 |
| Comparative Example 3 | — | 0 | 0.20 | 2.00 | 1.50 | 6.15 |
| Comparative Example 4 | <1> | 0.20 | 0.20 | 2.00 | 1.50 | 5.27 |
| Comparative Example 5 | <7> | 4.00 | 0.20 | 0 | 1.50 | 6.15 |

TABLE 3

| | (i) (I) Average transmittance in wavelength range of 450 to 600 nm [%] | Transmittance at wavelength of 700 nm [%] | (ii) (II) Maximum transmittance in wavelength range of 750 to 1080 nm [%] | Maximum transmittance in wavelength range of 800 to 950 nm [%] | Maximum transmittance in wavelength range of 800 to 1000 nm [%] | Maximum transmittance in wavelength range of 850 to 950 nm [%] | Maximum transmittance in wavelength range of 900 to 950 nm [%] | Maximum transmittance in wavelength range of 1000 to 1100 nm [%] |
|---|---|---|---|---|---|---|---|---|
| Ex. 1 | 76.63 | 1.32 | 0.62 | 0.62 | 0.62 | 0.62 | 0.62 | 0.41 |
| Ex. 2 | 74.91 | 1.85 | 0.46 | 0.46 | 0.46 | 0.46 | 0.34 | 0.20 |
| Ex. 3 | 83.58 | 10.44 | 4.02 | 3.83 | 3.93 | 3.83 | 3.70 | 4.28 |
| Ex. 4 | 82.47 | 11.68 | 5.00 | 5.00 | 5.00 | 3.38 | 3.38 | 4.12 |
| Ex. 5 | 74.46 | 3.98 | 1.99 | 1.99 | 1.99 | 1.33 | 1.25 | 1.68 |
| Ex. 6 | 76.16 | 7.85 | 4.50 | 4.50 | 4.50 | 3.38 | 1.25 | 4.13 |
| Ex. 7 | 78.31 | 7.58 | 2.33 | 2.33 | 2.33 | 1.59 | 1.59 | 2.06 |
| Ex. 8 | 75.22 | 2.71 | 1.42 | 1.42 | 1.42 | 1.17 | 1.02 | 1.33 |
| Ex. 9 | 80.54 | 4.42 | 0.85 | 0.74 | 0.85 | 0.74 | 0.74 | 0.92 |
| Comp. Ex. 1 | 83.55 | 2.54 | 92.51 | 92.24 | 92.40 | 92.24 | 92.24 | 92.56 |
| Comp. Ex. 2 | 81.36 | 23.27 | 3.39 | 0.17 | 0.17 | 0.02 | 0.02 | 0.03 |
| Comp. Ex. 3 | 83.89 | 32.81 | 7.73 | 0.81 | 0.81 | 0.19 | 0.18 | 0.23 |

TABLE 3-continued

| | | | | | | | | |
|---|---|---|---|---|---|---|---|---|
| Comp. Ex. 4 | 45.60 | 3.05 | 0.18 | 0.18 | 0.18 | 0.18 | 0.16 | 0.08 |
| Comp. Ex. 5 | 72.09 | 20.81 | 10.93 | 1.36 | 1.36 | 0.45 | 0.31 | 0.47 |

| | Maximum transmittance in wavelength range of 1100 to 1200 nm [%] | (iii) (III) IR cut-off wavelength [nm] | (iv) (IV) UV cut-off wavelength [nm] | Absorption maximum wavelength [nm] | Thickness of light-absorbing layer [μm] |
|---|---|---|---|---|---|
| Ex. 1 | 2.08 | 616 | 391 | 770 | 81 |
| Ex. 2 | 0.36 | 618 | 394 | 770 | 119 |
| Ex. 3 | 11.44 | 644 | 366 | 780 | 48 |
| Ex. 4 | 11.21 | 635 | 362 | 750 | 50 |
| Ex. 5 | 6.07 | 618 | 394 | 750 | 65 |
| Ex. 6 | 11.35 | 623 | 373 | 750 | 49 |
| Ex. 7 | 6.88 | 628 | 372 | 750 | 58 |
| Ex. 8 | 5.13 | 611 | 379 | 750 | 67 |
| Ex. 9 | 3.85 | 629 | 377 | 780 | 61 |
| Comp. Ex. 1 | 92.58 | 632 | 324 | 780 | 4 |
| Comp. Ex. 2 | 0.34 | 657 | 384 | 870 | 130 |
| Comp. Ex. 3 | 1.37 | 673 | 375 | 870 | 96 |
| Comp. Ex. 4 | 0.11 | 590 | — | — | 118 |
| Comp. Ex. 5 | 2.27 | 585 | 369 | 670/870 | 77 |

TABLE 4

| Wavelength [nm] | Transmittance [%] |
|---|---|
| 300 | 5.18 |
| 302 | 8.67 |
| 304 | 13.37 |
| 306 | 19.13 |
| 308 | 25.8 |
| 310 | 33.04 |
| 315 | 51.2 |
| 320 | 66.38 |
| 330 | 82.52 |
| 340 | 88.12 |
| 350 | 89.98 |
| 360 | 90.79 |
| 400 | 91.04 |
| 450 | 91.4 |
| 500 | 91.52 |
| 550 | 91.53 |
| 600 | 91.73 |
| 650 | 91.84 |
| 700 | 91.75 |
| 750 | 92.01 |
| 800 | 91.86 |
| 850 | 91.98 |
| 900 | 91.96 |
| 950 | 91.95 |
| 1000 | 92 |
| 1050 | 92.01 |
| 1100 | 91.94 |
| 1150 | 92.01 |
| 1200 | 92.09 |

The invention claimed is:

1. An optical filter comprising a light-absorbing layer having a thickness of 120 μm or less,
   the light-absorbing layer including a single layer having dispersed therein a copper phosphonate and an organic dye with a maximum-absorption-wavelength in a wavelength range of 720 nm to 780 nm,
   the light-absorbing layer satisfying the following requirements (i), (ii), (iii), (iv), and (v):
   (i) an average transmittance in a wavelength range of 450 nm to 600 nm is 74% or more;
   (ii) a maximum transmittance in a wavelength range of 750 nm to 1080 nm is 1% or less;
   (iii) an infrared cut-off wavelength is in a wavelength range of 600 nm to 680 nm, where the infrared cut-off wavelength is a wavelength at which a spectral transmittance is 50% in a wavelength range of 550 nm to 700 nm;
   (iv) an ultraviolet cut-off wavelength is in a wavelength range of 350 nm to 420 nm, where the ultraviolet cut-off wavelength is a wavelength at which a spectral transmittance is 50% in a wavelength range of 350 nm to 500 nm; and
   (v) a spectral transmittance at wavelength of 700 nm is 10% or less,
   wherein the light-absorbing layer is formed by curing a light-absorbing composition, and the light-absorbing composition contains an acid as a by-product of generation of the copper phosphonate at a concentration of 1 mass % or less.

2. The optical filter according to claim 1, the light-absorbing layer satisfying the following requirement (vi):
   (vi) a maximum absorption wavelength is in a wavelength range of 700 nm to 900 nm, where the maximum-absorption-wavelength is a wavelength at which a spectral transmittance is minimum in a wavelength range of 650 nm to 1000 nm.

3. A light-absorbing composition capable of hardening to form the light-absorbing layer according to claim 1, the light-absorbing composition further comprising:
   the copper phosphonate;
   the organic dye with a maximum-absorption-wavelength in a wavelength range of 720 nm to 780 nm;
   a curable resin; and
   an organic solvent;
   and the acid as a by-product of generation of the copper phosphonate with a concentration of 1 mass % or less.

4. The light-absorbing composition according to claim 3, wherein the light-absorbing composition has a viscosity of 100 mPa·s or less after the light-absorbing composition is stored under an atmospheric pressure environment at 20 to 25° C. for 72 hours.

5. The light-absorbing composition according to claim 3, wherein the acid includes an acetic acid.

6. The optical filter according to claim 1, the light-absorbing layer satisfying the following requirement (vi):
(vi) a spectral transmittance at wavelength of 700 nm is 10% or less.

7. The optical filter according to claim 1, the organic dye including at least one compound selected from the group consisting of a phthalocyanine compound, a cyanine compound, a squarylium compound, a diimmonium compound, a naphthalocyanine compound, and a croconium compound.

8. The optical filter according to claim 1, wherein the acid includes an acetic acid.

9. An optical filter comprising a light-absorbing layer having a thickness of 80 μm or less,
the light-absorbing layer including a single layer having dispersed therein a copper phosphonate and an organic dye with a maximum-absorption-wavelength in a wavelength range of 720 nm to 780 nm,
the light-absorbing layer satisfying the following requirements (I), (II), (III), (IV), and (V):
(I) an average transmittance in a wavelength range of 450 nm to 600 nm is 74% or more;
(II) a maximum transmittance in a wavelength range of 750 nm to 1080 nm is 5% or less;
(III) an infrared cut-off wavelength is in a wavelength range of 600 nm to 680 nm, where the infrared cut-off wavelength is a wavelength at which a spectral transmittance is 50% in a wavelength range of 550 nm to 700 nm;
(IV) an ultraviolet cut-off wavelength is in a wavelength range of 350 nm to 420 nm, where the ultraviolet cut-off wavelength is a wavelength at which a spectral transmittance is 50% in a wavelength range of 350 nm to 500 nm; and
(V) a spectral transmittance at wavelength of 700 nm is 15% or less,
wherein the light-absorbing layer is formed by curing a light-absorbing composition, and the light-absorbing composition contains an acid as a by-product of generation of the copper phosphonate at a concentration of 1 mass % or less.

* * * * *